US012225123B2

United States Patent
Yan et al.

(10) Patent No.: US 12,225,123 B2
(45) Date of Patent: *Feb. 11, 2025

(54) ELECTRONIC MAIL AUTHENTICATION AND TRACKING IN DATABASE SYSTEM USING MESSAGE IDENTIFIER WITHIN BODY OF ELECTRONIC MAIL

(71) Applicant: Salesforce, Inc., San Francisco, CA (US)

(72) Inventors: Minhui Yan, San Francisco, CA (US); Abhijit Bare, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 217 days.

This patent is subject to a terminal disclaimer.

(21) Appl. No.: 17/813,314

(22) Filed: Jul. 18, 2022

(65) Prior Publication Data

US 2024/0022406 A1 Jan. 18, 2024

(51) Int. Cl.
 *H04L 9/08* (2006.01)
 *H04L 9/32* (2006.01)
 (Continued)

(52) U.S. Cl.
 CPC ............... *H04L 9/088* (2013.01); *H04L 9/32* (2013.01); *H04L 9/321* (2013.01); *H04L 9/3242* (2013.01); *H04L 9/3263* (2013.01); *H04L 51/214* (2022.05); *H04L 63/0236* (2013.01); *H04L 63/08* (2013.01); *H04L 51/42* (2022.05); *H04L 63/20* (2013.01)

(58) Field of Classification Search
 CPC . H04L 9/088; H04L 9/32; H04L 9/321; H04L 9/3242; H04L 9/3263; H04L 51/214; H04L 63/0236; H04L 63/08; H04L 51/42; H04L 63/20
 See application file for complete search history.

(56) References Cited

U.S. PATENT DOCUMENTS 10,044,662 B1 * 8/2018 Mesters ............... H04L 51/216
10,509,843 B2 12/2019 Bare
(Continued)

OTHER PUBLICATIONS

U.S. Appl. No. 17/408,265, filed Aug. 20, 2021, 58 pages.

*Primary Examiner* — Cheng-Feng Huang
(74) *Attorney, Agent, or Firm* — Kwan & Olynick LLP

(57) ABSTRACT

Disclosed are systems, apparatus for tracking inbound email messages in association with database records. An outbound email message is automatically generated or updated to include a message identifier within one or more headers and within a body of the outbound email message. Subsequently, a first electronic mail message received via a network from a first client device is processed, where the first electronic message has one or more headers and a body. A first message identifier (ID) is obtained from the body and the first message ID is parsed such that an encrypted portion and one or more unencrypted portions are obtained. A secret key associated with the first electronic mail message is obtained and the first electronic mail message is authenticated using the secret key, the encrypted portion of the first message ID, and at least one unencrypted portion. The first electronic mail message is processed according to a result of authenticating the first electronic mail message.

20 Claims, 11 Drawing Sheets

(51) Int. Cl.
*H04L 9/40* (2022.01)
*H04L 51/214* (2022.01)
*H04L 51/42* (2022.01)

(56) References Cited

U.S. PATENT DOCUMENTS

| | | | | |
|---|---|---|---|---|
| 2007/0127784 | A1* | 6/2007 | Taylor | H04L 51/212 |
| | | | | 715/810 |
| 2009/0074159 | A1* | 3/2009 | Goldfarb | H04M 3/42059 |
| | | | | 379/88.21 |
| 2011/0258446 | A1* | 10/2011 | Brown | H04L 9/3247 |
| | | | | 713/168 |
| 2012/0216040 | A1* | 8/2012 | Tanamy | H04L 63/102 |
| | | | | 713/170 |
| 2013/0191402 | A1* | 7/2013 | Wilkins | H04L 9/08 |
| | | | | 707/752 |
| 2013/0238518 | A1* | 9/2013 | Miller | H04L 63/14 |
| | | | | 705/325 |
| 2015/0100894 | A1* | 4/2015 | Kumar | H04L 67/535 |
| | | | | 715/752 |
| 2015/0180845 | A1* | 6/2015 | Uomini | H04L 63/083 |
| | | | | 726/3 |
| 2019/0238494 | A1* | 8/2019 | LeVasseur | H04L 51/56 |
| 2020/0137081 | A1* | 4/2020 | Goldstein | H04L 63/083 |
| 2021/0136026 | A1* | 5/2021 | Parayil Kumarji | H04L 51/08 |
| 2021/0211410 | A1* | 7/2021 | Everton | H04L 51/08 |
| 2021/0409424 | A1* | 12/2021 | Seshadri | H04L 63/0428 |

* cited by examiner

ELECTRONIC MAIL AUTHENTICATION AND TRACKING IN DATABASE SYSTEM USING MESSAGE IDENTIFIER WITHIN BODY OF ELECTRONIC MAIL

COPYRIGHT NOTICE

A portion of the disclosure of this patent document contains material, which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to systems and techniques associated with electronic message processing. More specifically, this patent document discloses techniques for tracking electronic messages in association with database records.

BACKGROUND

"Cloud computing" services provide shared network-based resources, applications, and information to computers and other devices upon request. In cloud computing environments, services can be provided by servers to users' computer systems via the Internet and wireless networks rather than installing software locally on users' computer systems. A user can interact with social networking systems, electronic mail (email) systems, and instant messaging systems, by way of example, in a cloud computing environment.

Email systems enable messages to be exchanged between users using electronic devices. This typically involves transmitting messages over communication networks. Recipients of email messages may access their email messages via a mail box.

BRIEF DESCRIPTION OF THE DRAWINGS

The included drawings are for illustrative purposes and serve only to provide examples of possible structures and operations for the disclosed systems, apparatus, methods and computer program products for tracking electronic mail (email) messages in association with database records. These drawings in no way limit any changes in form and detail that may be made by one skilled in the art without departing from the spirit and scope of the disclosed implementations.

DETAILED DESCRIPTION

Figure 1:
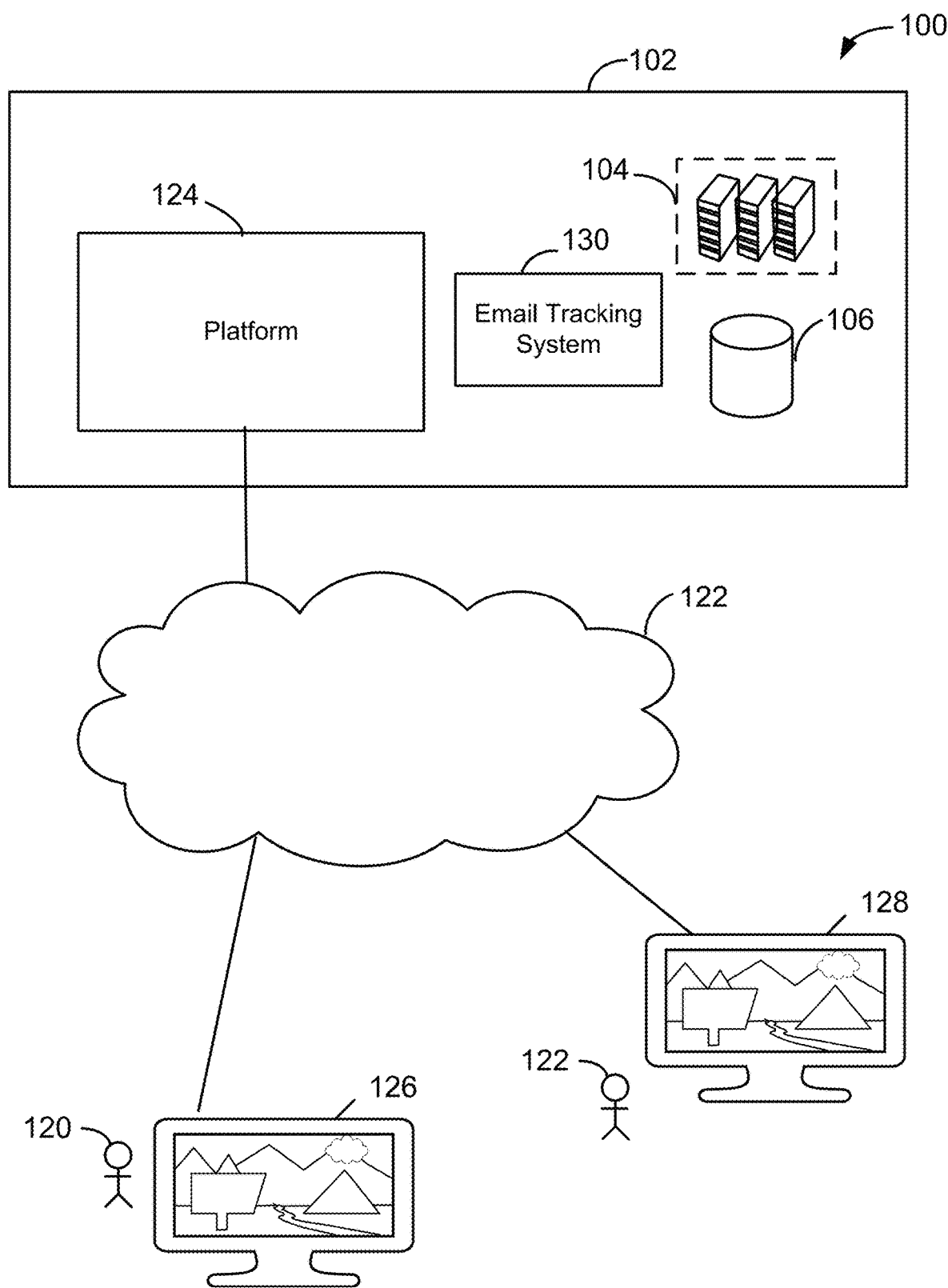
FIG. 1 shows a system diagram of an example of a system 100 in which electronic mail (email) messages may be tracked, in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations of the disclosed systems, apparatus, methods and computer program products are configured for tracking electronic mail (email) messages in association with database records. These techniques facilitate tracking inbound email messages received in response to outbound email messages transmitted in association with database records of a database system.

In many organizations, database systems are implemented to store customer data pertaining to entity records such as contacts, leads, cases, etc. For example, data pertaining to a case such as a customer support case may be stored in a corresponding database record of a database system. Often, organizations leverage Customer Relationship Management (CRM) systems to facilitate the management of customer data that may be received or derived from various channels such as telephone, email, live chat, marketing materials, and social media.

In some systems, when an outbound email message pertaining to an entity record is transmitted from an organization to a customer, a reference identifier (ID) corresponding to an entity record is generated and provided in one or more header fields of the outbound email message. For example, the system generated reference ID may be provided in a "Subject" field of the outbound email message. When a client device responds to the outbound email message, the client device copies the reference ID into a reply email message and transmits the reply email message to the organization. The organization's computing system or a customer service representative employed by the organization may then use the reference ID to identify the entity record that is pertinent to the reply email message. Unfortunately, the reference ID can be guessed by potential hackers. Therefore, the implementation of a reference ID in the subject field of an email presents an undesirable security issue.

In addition, there are additional drawbacks to the transmission of a reference ID in the subject field of an email. More particularly, a reference ID cannot be used to authenticate an inbound email, further compromising the security of organizational data.

In accordance with various implementations, techniques are disclosed for tracking email messages pertaining to database records using message identifiers. In some implementations, a message identifier (ID) is generated for an outbound email message, where the message ID includes one or more unencrypted portions and an encrypted portion, where the unencrypted portions include an entity identifier associated with a corresponding database record, which may also be referred to as an entity record.

While it is possible to provide the system generated message ID in header(s) of the outbound email message, some email client devices do not obey email protocols and therefore do not put the correct information in the headers when replying to emails or forwarding emails. For example, a client system may not put the message ID from the received email in the reply email's In-Reply-To header or insert the message ID into the list of message ID strings in the References header. Thus, providing the message ID in the header(s) of the outbound email message may be insufficient to enable reply messages to the outbound email message to be accurately tracked.

In accordance with various implementations, since client devices or associated servers may not follow the email protocol, the system generated message ID is provided in a body of the outbound email message. The message ID may be inserted within the body in the form of a string, which may be visible or invisible to a user receiving the email. Once generated, the outbound email message is then transmitted to a recipient.

In some implementations, the system generated message ID is provided in one or more message headers (e.g., Message-ID and/or References header) of the outbound email message, as well as the body of the outbound email message. For example, the message ID can be provided in the Message-ID header field of the outbound email message. Typically, when a client device transmits a reply email message in response to the outbound email message, the client device would copy the message ID from the Message-ID header to the In-Reply-To header and insert the message ID into the list of message IDs within the References header. However, if the client device or its associated server(s) do not obey email protocol, the message ID is not inserted into the In-Reply-To header of the reply email message or the References header. Therefore, it would be impossible in this example to authenticate and track the client-transmitted reply email message using a header of the reply email message.

As another example, the system generated message ID (for tracking purposes) is provided in the References header field of the outbound email message, as well as the body of the outbound email message. The system may also generate a random message ID to be placed in the Message-ID header, not for tracking purposes, but to obey the email protocol (since the email protocol typically requires that every email has a Message ID in the Message-ID header). Typically, when an email client device transmits a reply email message in response to the outbound email message, the email client device would put the non-tracking message ID of the Message-ID header into the list of Message ID strings in the References header, while keeping the tracking message ID string inside the list of Message ID strings in the References header. However, some email clients remove the References header by setting the References header to empty. In this example, it would be impossible to authenticate and track the client-transmitted reply email message using a header of the reply email message.

As discussed above, if the client device or its associated server(s) do not obey email protocol, the message ID may not be transmitted in the reply email message. As a result, it would be impossible to successfully authenticate and track the reply email message using one of the headers. By providing the message ID in the body of an outbound email message, this increases the likelihood that it will remain in the body of the inbound reply email message. As a result, the message ID can be used to authenticate and track the inbound reply email message successfully.

In some implementations, techniques are disclosed for generating a message ID used to track email messages pertaining to a database record. A secret key associated with the org is obtained. The secret key is then applied to encrypt a set of one or more items pertaining to the outbound email message such that an encrypted portion is generated. The set of items can include, but are not limited to, one or more of: an entity identifier associated with the database record, an organization identifier, a key identifier, and/or a randomly generated string. A message ID including the encrypted portion and one or more unencrypted portions is generated, where the unencrypted portions include the entity identifier associated with the database record.

In some implementations, the unencrypted portions further include, but are not limited to, the organization identifier and/or key identifier.

In accordance with various implementations, techniques are disclosed for processing an inbound email message received from a client device. More particularly, a message ID can be obtained from header(s) and/or the body of the inbound email message to authenticate the inbound email message, as detailed below.

In some implementations, a message ID in a header(s) and/or body of the inbound email message is used to authenticate the inbound email message. The headers can include an In-Reply-To header and/or a References header. More particularly, the header(s) and/or body can be processed until the inbound email message is authenticated such that a valid record ID is obtained. For example, if authentication using a value of the In-Reply-To header is unsuccessful, authentication can be attempted using a value of the References header, or vice versa. If a valid record ID cannot be obtained from a header, the message ID can be extracted from the body of the inbound email message and processed to obtain a valid record ID.

In other implementations, a message ID can initially be obtained from the body of the inbound email message and the message ID can be processed as described herein. Unfortunately, it is possible for the message ID in the body of the inbound email message to be deleted or removed by a user sending the email message. Thus, if the message ID obtained from the body does not yield a valid record ID, a message ID from header(s) of the inbound email message can be processed.

While it is possible to process the message ID in the body of the inbound email message prior to that provided in header(s) of the inbound email message, the body will generally contain a greater amount of content to parse in order to extract the message ID. As a result, extracting a message ID from the body of the inbound email message consumes more computation power than extraction of the message ID from headers. Therefore, in most instances, it will be beneficial to extract/process the header(s) prior to the body of the inbound email messages.

The message ID or message ID string can be parsed such that an encrypted portion and one or more unencrypted portions are obtained, where a first unencrypted portion includes an entity identifier associated with a database record. The authentication of an electronic mail based upon a message ID is also disclosed in U.S. patent application Ser. No. 17/408,265, entitled "Electronic Mail Authentication and Tracking in a Database System," by Minhui Yan et al, filed on Aug. 20, 2021, which is incorporated herein in its entirety and for all purposes. A secret key associated with the inbound email message is obtained from a key repository. The inbound email message is authenticated using the secret key, the encrypted portion, and at least one unencrypted portion. The inbound email message is stored in association with the database record according to a result of authenticating the inbound email message. In this manner, a valid record ID is obtained for an authenticated inbound email message.

By way of illustration, an organization, Acme Construction, Inc., implements an automated case closure process that transmits an automated email to a user of the system after a case initiated by the user has been inactive for a period of 60 days. Upon generation of an automated email addressed to Daniel notifying him of closure of a case initiated by Daniel, a message ID is generated and provided in Message-ID header and the message body of the email. The email including the message ID is then transmitted to Daniel.

Upon receipt of the email, Daniel is surprised to see that the case has been closed since the issue that prompted opening the case has not been resolved. Daniel replies to the email. In the reply email message, Daniel requests that someone contact him regarding the case. In some instances, the client device automatically copies the received message ID to one or more headers (e.g., In-Reply-To and/or References) in the reply email. In some other instances, the client device may not put the received message ID to one or more of the headers (e.g., In-Reply-To and/or References) in the reply email.

Upon receipt of the reply email message, the message ID can be obtained from at least one of the headers (e.g., In-Reply-To and/or References) of the reply email message. If the inbound email message cannot be successfully authenticated using a message ID obtained from one of the headers, a message ID string can be obtained from the body, parsed, and processed to authenticate the reply email message. Upon successful authentication, the system can store the reply email message or portion thereof (e.g., email and any attachments) in association with a database record corresponding to a case identified by an entity identifier in an unencrypted portion of the message ID/message ID string.

Alternatively, in other implementations, upon receipt of the inbound email message, the message ID is obtained from the body of the inbound email message. If the inbound message cannot be successfully authenticated using the message ID obtained from the body of the inbound email message, the system attempts to authenticate the inbound email message using the message ID obtained from header(s) of the inbound email message. An example will be instructive.

If an authenticated message ID cannot be obtained from either inbound email's headers or body, a new entity record can be created in the database and the email is associated with that new entity record. For example, the email can be stored in the new entity record. As another example, the new entity record may include a pointer or identifier associated with the email.

FIG. 1 shows a system diagram of an example of a system 100 in which electronic mail (email) messages may be tracked, in accordance with some implementations. Database system 102 includes a variety of different hardware and/or software components that are in communication with each other. In the non-limiting example of FIG. 1, system 102 includes any number of computing devices such as servers 104, which may include one or more email servers. Servers 104 are in communication with one or more storage mediums 106 configured to store and maintain relevant metadata used to perform some of the techniques disclosed herein, as well as to store and maintain relevant data and/or metadata generated by the techniques disclosed herein. Storage mediums 106 may further store computer-readable instructions configured to perform some of the techniques described herein. Storage mediums 106 can store emails in databases, which may be updated and accessed as described in further detail below. In some implementations, storage mediums 106 can include a CRM database in which database records corresponding to entity identifiers may be stored.

In some implementations, system 102 is configured to store user profiles/user accounts associated with users of system 102. Information maintained in a user account (e.g., email account) of a user can include or indicate a user email address and credentials of the user. For example, credentials of the user can include a username and password.

Client devices 126, 128 may be in communication with system 102 via network 122. More particularly, client devices 126, 128 may communicate with servers 104 via network 122. For example, network 122 can be the Internet. In another example, network 122 comprises one or more local area networks (LAN) in communication with one or more wide area networks (WAN) such as the Internet.

Embodiments described herein are often implemented in a cloud computing environment, in which network 122, servers 104, and possible additional apparatus and systems such as multi-tenant databases may all be considered part of the "cloud." Servers 104 may be associated with a network domain, such as www.salesforce.com and may be controlled by a data provider associated with the network domain. A user of client computing device 126 can have an account at salesforce.com®. By logging into this account, the user can access the various messaging services provided by servers 104. Messaging services may also be accessed via an application installed on a client device.

In some implementations, users 120, 122 of client devices 126, 128 can access email services by logging into system 102 via platform 124. More particularly, client devices 126, 128 can log into system 102 via an application programming interface (API) or via a graphical user interface (GUI) using credentials of corresponding users 120, 122, respectively. Email services can include, for example, generating, transmitting, opening email messages, and/or accessing email event status information.

Users 120, 122 can send and/or receive emails transmitted between client devices 126, 128. In addition, users 120, 122 can receive emails that are auto-generated by system 102. Examples of devices used by users include, but are not limited to a desktop computer or portable electronic device such as a smartphone, a tablet, a laptop, a wearable device such as Google Glass®, another optical head-mounted display (OHMD) device, a smart watch, etc.

In some implementations, system 102 includes an email tracking system 130 that facilitates tracking of inbound emails that pertain to database records of database(s) of storage mediums 106. Tracking may be performed on a global basis, for specific organizations, or for a subset of inbound emails, as will be described in further detail below. For example, tracking may be performed for specific tenant(s) of a multi-tenant database.

In some implementations, tracking is performed for reply emails transmitted in response to system emails that are automatically generated by system 102. In other implementations, tracking is performed for reply emails transmitted in response to user-generated emails originating from employees of system 102. For example, tracking may be performed for reply emails transmitted in response to emails originating from employees in the customer service department of system 102.

In this example, user 120 of client device 126 is a customer service representative. User 120 may generate and send an outbound email pertaining to an entity record such as a case to user 122 of client device 128. Alternatively, system 102 may generate and send an automated outbound email pertaining to an entity record to user 122. User 122 then generates and sends a reply email pertaining to the case. Email tracking system 130 processes the outbound email and subsequent reply email, as will be described in further detail below. The reply email can be stored in association with a database record corresponding to the case according to a result of authentication of the reply email, as described herein. Communication among components of system 102 may be facilitated through a combination of networks and interfaces.

Figure 2:
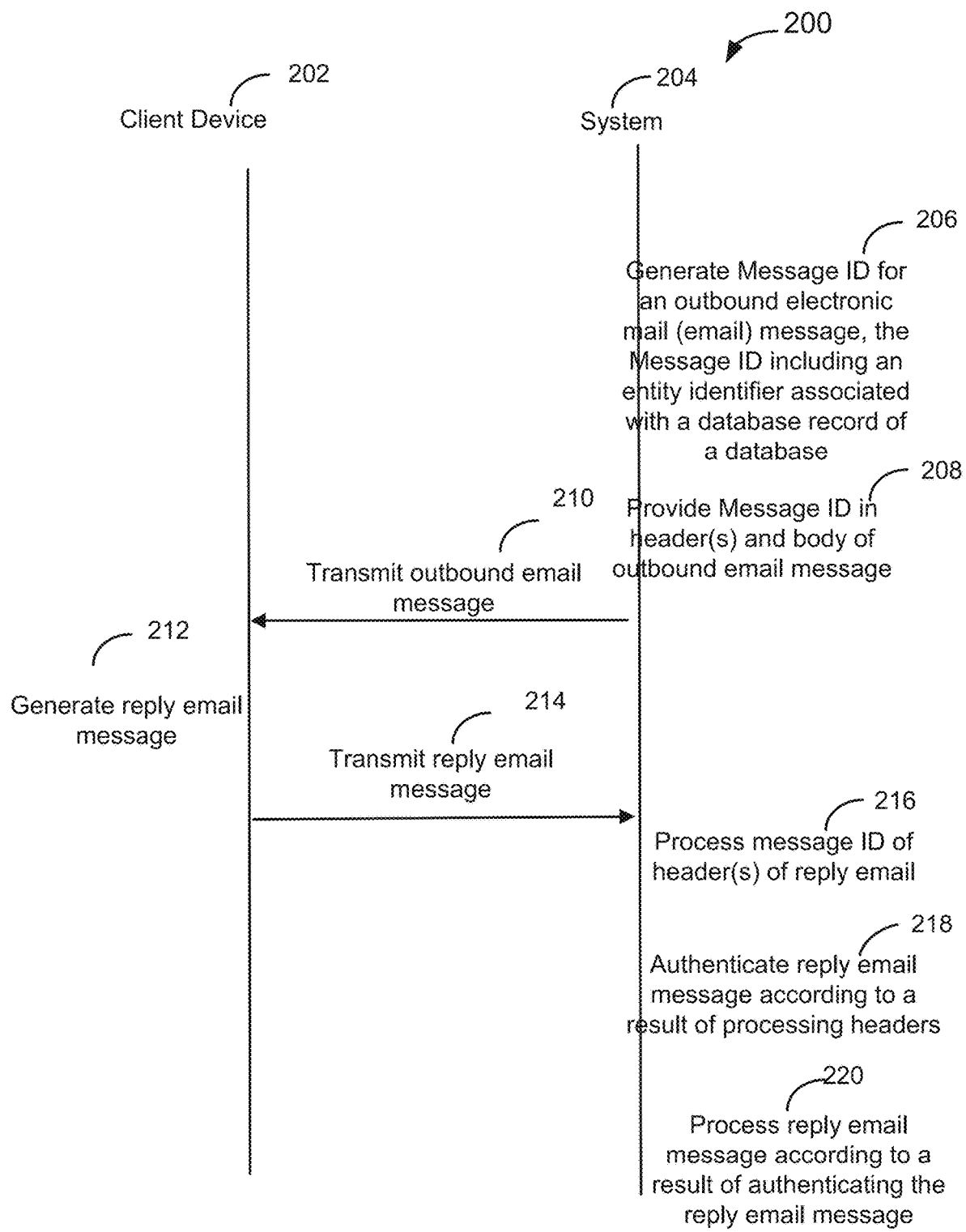
FIG. 2 shows a transaction flow diagram 200 illustrating an example of a process for tracking email messages in association with database records.

FIG. 2 shows a transaction flow diagram 200 illustrating an example of a process for tracking email messages in association with database records. Operations performed by a client device and email tracking system 130 are represented by vertical lines 202, 204, respectively. As shown in this example, an outbound email message is generated via system 204. The outbound email message may be composed by a user of email tracking system 130 or may be automatically generated via a system component of system 102. For example, a user of email tracking system 130 may compose the outbound email message via another client device (not shown to simplify illustration). In some implementations, email tracking system 130 receives, intercepts, or otherwise obtains the outbound email message prior to its transmission to the addressee of the outbound email message.

Email tracking system 130 generates a message ID for the outbound email message at 206, where the message ID includes an entity identifier associated with a database record of a database. More particularly, email tracking system 130 can generate the message ID responsive to determining that the outbound email message has been generated. Alternatively, email tracking system 130 can generate the message ID responsive to a request to transmit the outbound email message. In some implementations, the message ID may be generated by a system component that intercepts the outbound email message after it has been transmitted.

In some implementations, to generate the message ID, email tracking system 130 obtains a secret key associated with the outbound email message. The secret key may be applied to a set of one or more items associated with the outbound email message to generate an encrypted portion of the message ID. The message ID includes one or more unencrypted portions and the encrypted portion. The unencrypted portions can include the set of items used to generate the encrypted portion. More particularly, the unencrypted portions can include the entity identifier associated with the outbound email message. In addition, the unencrypted portions can include additional items such as an organization (e.g., tenant) identifier, a key identifier associated with the secret key, and/or a string, which may be randomly generated. The items used to generate the encrypted portion of the message ID can include one or more items in at least one unencrypted portion. For example, the encrypted portion of the message ID can be generated by applying the secret key to one or more of: the entity identifier, the key identifier, the organization identifier, or a string that has been generated by email tracking system 130.

Email tracking system 130 provides the message ID in one or more message headers (e.g., References and Message ID) of the outbound email message and a message body of the outbound email message at 208. For example, the message ID may be provided in the form of a string within the message body of the outbound email message. A predefined set of characters can delineate the message ID within the message body.

An email message may be transmitted in the form of text. Alternatively, an email message may be transmitted via Hypertext Markup Language (HTML).

The message ID may be provided within the message body such that it is not visible. For example, the message ID may be provided within the message body using Cascading Style Sheets (CSS). This enables the message ID string to be provided in the body of the email without confusing the user receiving the email. Alternatively, the message ID may be provided within the message body such that it is visible to a user viewing the message.

The outbound email message is then transmitted to the intended recipient at 210. Email tracking system 130 may transmit the outbound email message via an email server (not shown to simplify illustration).

Upon receiving the outbound email message, a user of client device 202 may choose to compose a reply email message at 212. Client device 202 may copy the message ID from the outbound email message header(s) to the message header(s) of the reply email message, as described herein. However, in some instances, client device 202 or an associated server device may remove the message ID from the email header(s). Thus, it is desirable to provide the message ID in the body of the outbound mail message, increasing the likelihood that the message ID will be further transmitted in the reply email message by client device 202. Responsive to the user initiating the sending of the reply email message, client device 202 transmits the reply email message at 214 to the sender of the outbound email message.

Email tracking system 130 may receive the reply email message via an email server. In some implementations, email tracking system 130 obtains a message ID from at least one of the message headers of the reply email message and attempts to authenticate the reply email message at 216 by processing the message ID. Email tracking system 130 then authenticates the reply email message using the pertinent message ID according to a result of processing the headers at 218, as described in further detail below. More particularly, email tracking system 130 can obtain a secret key associated with the reply email message and authenticate the reply email message using the secret key and the message ID in one of the message headers, if possible.

If the reply email message is not successfully authenticated using a message ID in one of the headers, an attempt may be made to authenticate the reply email message by obtaining a message ID from the body of the reply email message and processing, as described herein. More particularly, email tracking system 130 authenticates the reply message using the secret key and a message ID obtained from the message body.

System 130 can then process the email message according to a result of the authentication at 220. Specifically, if the reply email message is successfully authenticated, the reply email message may be saved in association with the database record.

While the message ID in the reply email header(s) is processed initially in this above-described example, it is important to note that this example is merely illustrative and other implementations in which the message ID is initially obtained from the body are also possible.

In the event that authentication is not successful, the reply email message may be processed in a number of ways. In some instances, the system may determine that there is a possibility or likelihood that the reply email message is still authentic. In these situations, the system can create the newly created database record, as appropriate. In other instances, the system may conclude that the reply email message is a forged email or has a high probability of being a forged email.

In some implementations, the system transmits a notification message of failed authentication to one or more individuals such as a system administrator. For example, the system may generate and transmit a notification message that provides a system administrator with the reply email message, a link to the reply email message, information from the reply email message (e.g., source email address), or information identifying the newly created database record. The system administrator may then choose to further investigate the forged email or review the identifier, which can be used to track email messages in association with database records.

Figure 3A:
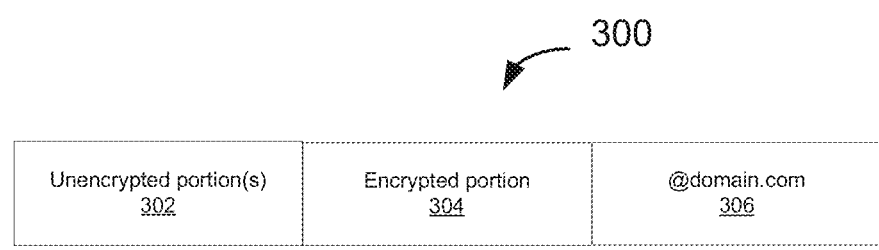
FIG. 3A shows a diagram illustrating an example format of a system generated message identifier 300 that can be used to track email messages in association with database records, in accordance with some implementations.

FIG. 3A shows a diagram illustrating an example format of a system generated message ID 300 that can be used to track email messages in association with database records. As shown in this example, message ID 300 includes one or more unencrypted portions 302 and at least one encrypted portion 304. In some implementations, unencrypted portions 302 may be a predefined length. Similarly, the encrypted portion 304 may be a predefined length. Alternatively, unencrypted portions 302 and/or encrypted portion 304 may be of variable lengths.

In some implementations, final portion 306 of message ID 300 can include an symbol followed by a domain identifier. Thus, the portion prior to the "@" symbol (e.g., excluding the domain identifier) may be processed, as described herein.

Figure 3B:
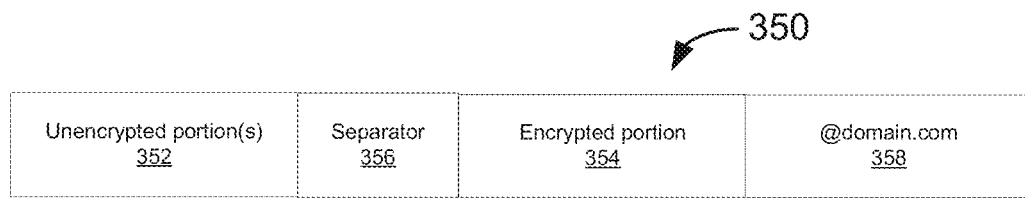
FIG. 3B shows a diagram illustrating another example format of a system generated message identifier 350 that can be used to track email messages in association with database records, in accordance with some implementations.

In other implementations, a set of characters delineates the encrypted portion from the unencrypted portions. FIG. 3B shows a diagram illustrating another example format of a system generated message ID 350 that can be used to track email messages in association with database records, in accordance with some implementations. In this example, unencrypted portions 352 and encrypted portion 354 are separated by a delineator 356. For example, delineator 356 can include a special character such as \, /, [,], *, &, #, or $. In some implementations, final portion 358 of message ID 350 can include an "@" symbol followed a domain identifier.

In the above examples, the unencrypted portions are in a first segment of the message ID. However, this example is merely illustrative. Therefore, unencrypted portions and encrypted portion of the message ID may be provided in any order within the message ID.

In some implementations, a message ID string is identified within (e.g., extracted from) the message body in the event that the message cannot be authenticated using a message ID in the header(s) of the message. In other implementations, the message ID string is obtained from the message body prior to processing the message headers.

A message ID string can be identified within and extracted from a message body via a search for a predefined set of characters (that serves as a prefix or delineator to the message ID string), which may be visible to a user or invisible. A message ID string need not include a domain identifier, as detailed above.

Figure 4:
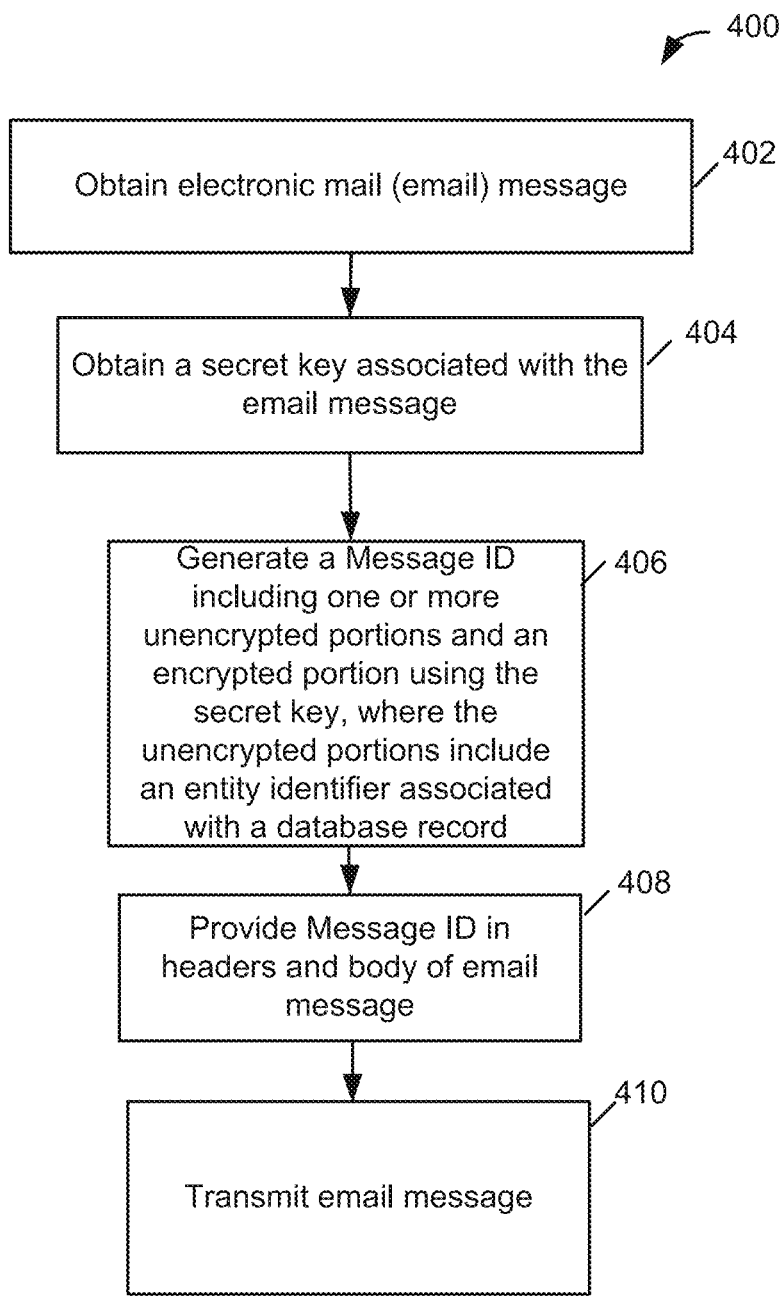
FIG. 4 shows a process flow diagram 400 illustrating an example of a method for processing outbound email messages, in accordance with some implementations.

FIG. 4 shows a process flow diagram 400 illustrating an example of a method for processing outbound email messages, in accordance with some implementations. The system obtains an outbound email message associated with a database record at 402, where the database record is identified by or otherwise associated with an entity identifier. For example, the outbound email message may be associated with a particular case identifier. The system obtains a secret key associated with the outbound email message at 404. In some implementations, the system may retrieve the secret key from a repository of secret keys. For example, the system may ascertain an organization identifier of an organization via which the outbound email message is generated. Thus, the system may look up the organization identifier to retrieve a corresponding secret key. In some implementations, the system may periodically rotate among two or more secret keys associated with the organization identifier, thereby increasing the security of the message ID. Where an organization has two or more secret keys associated therewith, a secret key may be further identified by a corresponding key identifier.

In other implementations, the system may dynamically generate a secret key for the outbound email message. The system may subsequently store the secret key in a key repository in association with an identifier such as the organization identifier and/or key identifier.

The system generates a message ID including one or more unencrypted portions and an encrypted portion using the secret key at 406, where the unencrypted portions include an entity identifier associated with a database record. The unencrypted portions of the message ID can further include the organization identifier and/or a key identifier. In addition, the unencrypted portions can include a randomly generated string. For example, the system may generate a string that uniquely identifies the outbound email message. The system may generate the encrypted portion of the message ID using the secret key and a set of items that are transmitted in at least one encrypted portion of the message ID. More particularly, the system may encrypt the unencrypted portion or a portion thereof using an encryption algorithm to generate the encrypted portion. The unencrypted portion can include, but is not limited to, the entity identity identifier, an organization identifier, a key identifier, and/or randomly generated string. In other words, the system may encrypt one or more items in unencrypted portion(s) of the message ID to generate the encrypted portion of the message ID.

In some implementations, information can be provided in the unencrypted portion(s) of the message ID for use in identifying the secret key, enabling decryption of the encrypted portion of the message ID upon retrieval from an inbound reply email message. For example, the unencrypted portion(s) of the message ID can include the organization identifier and/or key identifier. In other implementations, the secret key may subsequently be retrieved using information that is not transmitted in the message ID of the outbound email message.

It is important to note that while the organization identifier can be used to retrieve a secret key, the organization identifier need not be included in the message ID or otherwise transmitted in the outbound email message. Rather, the organization identifier may be ascertained via other mechanisms, such as by performing a lookup in an organization identifier mapping table using a domain or email address. Therefore, to prevent the leak of confidential information, the organization identifier may not be included in the message ID.

The unencrypted portion can be generated by appending a plurality of items including the set of items in a predefined order. For example, the unencrypted portion can include a message ID that includes an entity identifier, followed by an organization identifier.

In some implementations, the system generates the encrypted portion such that it is a predefined length. The system may similarly generate the unencrypted portion(s) such that it is a predefined length, which may be the same length as the encrypted portion or may be a different length from the unencrypted portion(s).

In other implementations, the encrypted portion and/or unencrypted portion may be a variable length. The message ID may be generated such that a delineator including a predefined set of special characters delineates the encrypted portion from the unencrypted portion(s). Individual item(s) in unencrypted portion(s) may similarly be of a predefined length or, alternatively, may be delineated from one another by a delineator that includes a predefined special character. The delineator(s) used to delineate items within unencrypted portion(s) may be the same or different from delineator(s) used, if any, to separate the encrypted portion from the unencrypted portion(s).

In some implementations, the system generates the message ID for the outbound email message by calling an application programming interface (API).

More particularly, the API may be called by passing an entity identifier, an organization identifier, a key identifier, and/or a randomly generated string as parameters of the API. A message ID may then be returned via the API.

The system provides the message ID in message header(s) (e.g., Message-ID and References) of the outbound email message and in the body of the outbound email message at 408 and transmits the outbound email message at 410 to the intended recipient. For example, the message ID may be provided in two different Message-ID headers of the outbound email message.

In some implementations, the message ID is provided in the body in the form of a string. As described herein, the string need not include the domain associated with the organization/tenant. Thus, the message ID string inserted into the body of the email message need not include the "@" symbol or domain. In some implementations, the system provides the message ID in the body using CSS. By providing the message ID within the body, this enables the pertinent message ID to be relayed in the event that email client(s) or associated server(s) do not obey the email protocols.

Figure 5A:
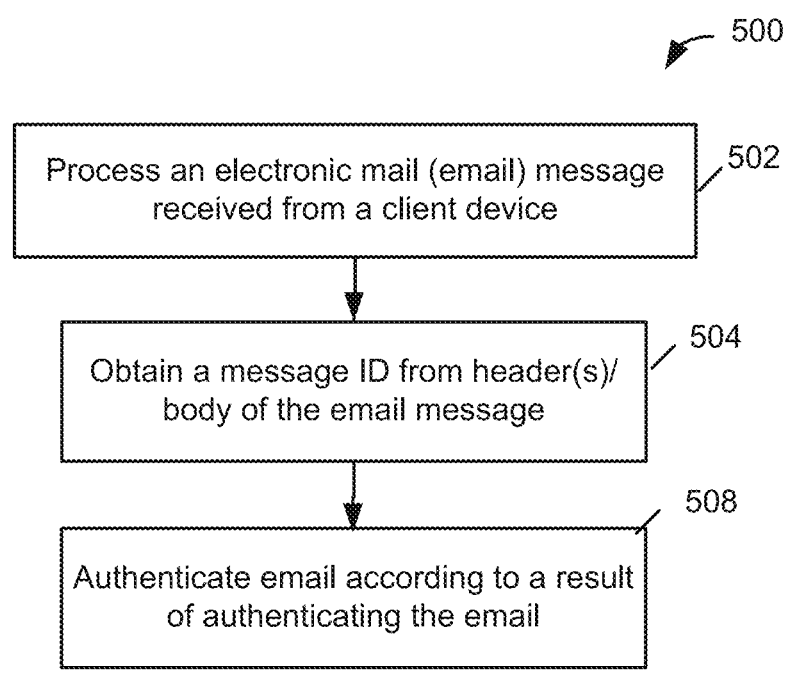
FIG. 5A shows a process flow diagram 500 illustrating an example of a method for processing inbound email messages, in accordance with some implementations.

Upon receiving an inbound email message from a client device in response to the outbound email message, the system processes the inbound email message. FIG. 5A shows a process flow diagram 500 illustrating an example of a method for processing inbound email messages, in accordance with some implementations. As shown in this example, the system processes an inbound email message received via a network from a client device in response to the outbound email message at 502, where the inbound email message has one or more headers that each has the possibility of including a corresponding message ID (e.g., if added correctly by the client device or associated server). For example, the headers can include a References header and an In-Reply-To header.

The system may authenticate the inbound email using a message ID obtained from the headers or body. More particularly, the system can obtain a message ID from one of the headers or from the body at 504. The system may then attempt to authenticate the inbound email using the obtained message ID at 508 and process the email message according to a result of this attempt. More particularly, if authentication using the headers is unsuccessful, the system may attempt to authenticate the inbound email message using another message ID extracted from the body of the inbound email message. Alternatively, in other implementations, the system may initially obtain a message ID/message ID string from the body of the inbound email message and use this message ID string to authenticate the inbound email message prior to extracting a message ID from the header(s).

In some implementations, the system searches the body of the inbound email message for a set of delineating characters that precede and/or delineate a message ID/message ID string. For example, the delineating characters can include a bracket and/or "Ref" character string. The delineating characters may be a predefined set of characters that is not commonly used. The system may then obtain the message ID/message ID string and/or parse it, as described herein.

As described herein, a message ID/message ID string can be parsed to obtain an encrypted portion and one or more unencrypted portions, where an unencrypted portion includes an entity identifier associated with a database record of a database. In some implementations, where the unencrypted portion(s) have a predefined length of a specific number of characters, the system parses the message ID by obtaining a portion of the message ID having the number of characters. The remaining encrypted portion may be obtained in a similar manner by obtaining a specific number of characters of a predefined length, which may be the same length as the unencrypted portion(s) or may be a different length from the unencrypted portion(s). Alternatively, assuming that the unencrypted portion(s) are in an initial (e.g., leftmost) portion of the message ID, the encrypted portion may be obtained by identifying the remaining characters of the message ID preceding the "@" character).

In other implementations, a delineator (e.g., set of delineating characters) present in or preceding the message ID/message ID string is used to facilitate parsing the message ID. More particularly, the system may parse the message ID, for example, by sequentially retrieving individual characters from the message ID (e.g., from left to right) until a delineator is recognized or after recognition of such a delineator. This process may be performed, for example, to obtain the unencrypted portion(s) delineated from the encrypted portion by the delineator.

In some implementations, the system parses the message ID or unencrypted portion(s) to obtain individual item(s) such as an entity identifier, organization identifier, key identifier, and/or string. More particularly, the system may obtain a sequence of characters having a length of a predefined number of characters. For example, the predefined number of characters may correspond to a particular item type (e.g., entity identifier type, organization identifier type, key identifier type, or string type). Alternatively, the system may parse the message ID or unencrypted portion(s) to obtain individual item(s) by retrieving a sequence of characters delineated or preceded by a particular delineator including a special character. As described above, a delineator used to delineate items within unencrypted portion(s) of the message ID may be the same or different from a delineator used (if any) to delineate the encrypted portion of the message ID form the unencrypted portion(s).

The system obtains a secret key associated with the inbound email message and authenticates the inbound email message at 508. In some implementations, the secret key is associated with the domain, organization identifier, or associated computing system. For example, the secret key may be obtained via a lookup of the organization identifier in a key repository (e.g., database). In other implementations, the secret key is one of multiple secret keys associated with an organization. For example, the system may obtain a key identifier from the unencrypted portion(s) of the message ID and use the key identifier to look up the pertinent secret key in a key repository.

Figure 5B:
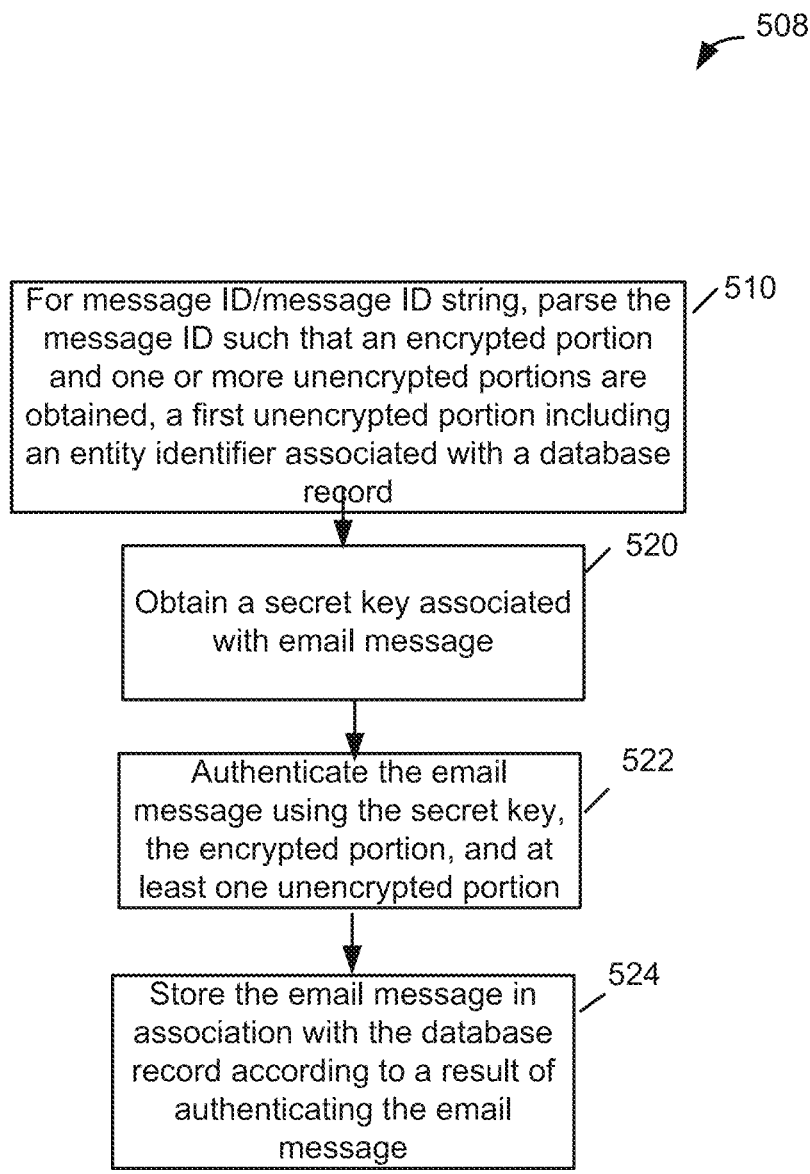
FIG. 5B shows a process flow diagram 508 illustrating an example of a method of authenticating an inbound email message, in accordance with some implementations.

FIG. 5B shows a process flow diagram 508 illustrating an example of a method of authenticating an inbound email message, in accordance with some implementations. As shown in FIG. 5B, the system obtains a secret key at 520 and applies the secret key to the message ID (in the message header(s)) or message ID string (in the message body) in an attempt to authenticate the inbound email message.

The system authenticates the inbound email message using the secret key, the encrypted portion, and at least one unencrypted portion of the pertinent message ID/message ID string at 522. In some implementations, the system decrypts the encrypted portion using the secret key and compares a result of the decryption with the set of items in the unencrypted portion. In other words, the system may compare a result of the decryption with the unencrypted portion or a portion thereof. If the comparison operation returns a result indicating that the operands are equal, the system determines that authentication is successful. However, if the operands are not equal, the system determines that authentication has failed.

In other implementations, the system encrypts the unencrypted set of items in the unencrypted portion using the secret key and compares a result of the encryption with the encrypted portion. Stated another way, the system may compare a result of the encryption with the encrypted portion. If the comparison operation returns a result indicating that the operands are equal, the system concludes that authentication is successful. Alternatively, if the operands are determined to not be equal, the system concludes that authentication has failed.

In the event that the system determines that authentication has failed, the system may make further attempt(s) to authenticate the inbound email message using one or more additional secret keys, as described herein. Secret keys may be retrieved using information maintained in a database and/or information in the unencrypted portion of the message ID.

In some implementations, if authentication fails, the system retrieves another secret key associated with the organization. The system applies the subsequently retrieved secret key in a subsequent attempt to authenticate the inbound email. The system may apply currently active secret keys until authentication is successful. In some instances, the system may apply previously active secret keys if application of currently active secret keys is unsuccessful. Therefore, the system may apply one or more secret keys in an attempt to authenticate the inbound email.

In some implementations, authentication of the inbound email message and/or other related processing of the inbound email message can be performed by calling an application programming interface (API). More particularly, the API may be called by passing a message ID or portion thereof as parameters of the API. For example, the parameters can include an entity identifier, an organization identifier, a key identifier, a string, and/or an encrypted portion of the message ID/message ID string of the inbound email message as parameters of the API. The API may return an indication of whether the inbound email message has been successfully authenticated and/or the entity identifier associated with the pertinent database record.

In some implementations, the system may ascertain a confidence level indicating a likelihood that the inbound email message has been generated by a hacker. For example, if the entity identifier is correct but other information in the unencrypted portion is incorrect, this may indicate a system error rather than the generation of the inbound email by a hacker. If the confidence level exceeds a predefined threshold, the system may conclude that the inbound email message is unlikely to have been generated by a hacker. However, if the confidence level does not exceed the predefined threshold, the system may conclude that the inbound email message is likely to have been generated by a hacker.

For example, a computer model may be trained using historical data pertaining to inbound email messages and authentication thereof. The computer model may then be applied to determine the likelihood that the inbound email message is authentic rather than generated by a hacker.

The system may store the inbound email message in association with the database record according to a result of the authentication at 524. More particularly, if authentication is successful, the inbound email message may be stored in association with the database record identified by the entity identifier. For example, the inbound email message may be stored in a field of the database record or otherwise linked to the database record. However, if authentication has failed, the system may discard the inbound email message. Alternatively, if authentication has failed and/or there is a low likelihood that the inbound email message has been generated by a hacker, the system may save the inbound email in a new database record, enabling a representative to review the inbound email message and process it accordingly. For example, the system may create a new case database record and store the inbound email message in association with the new case database record.

In some implementations, in the event that authentication of the inbound email message fails, the system transmits a notification of an authentication failure to one or more individuals. The notification can be transmitted via email or another mechanism.

Upon review of the inbound email message, a user such as a customer service agent may review the inbound email message to determine whether it has been generated by a hacker. The historical data may be updated to include an indication of whether the inbound email message is considered to be generated by a hacker. The computer generated model may subsequently be updated based upon the updated historical data.

In some implementations, selective processing of email messages is performed for outbound and inbound email messages. An example of a selective processing implementation will be described in further detail below with reference to FIGS. 6 and 7.

Figure 6:
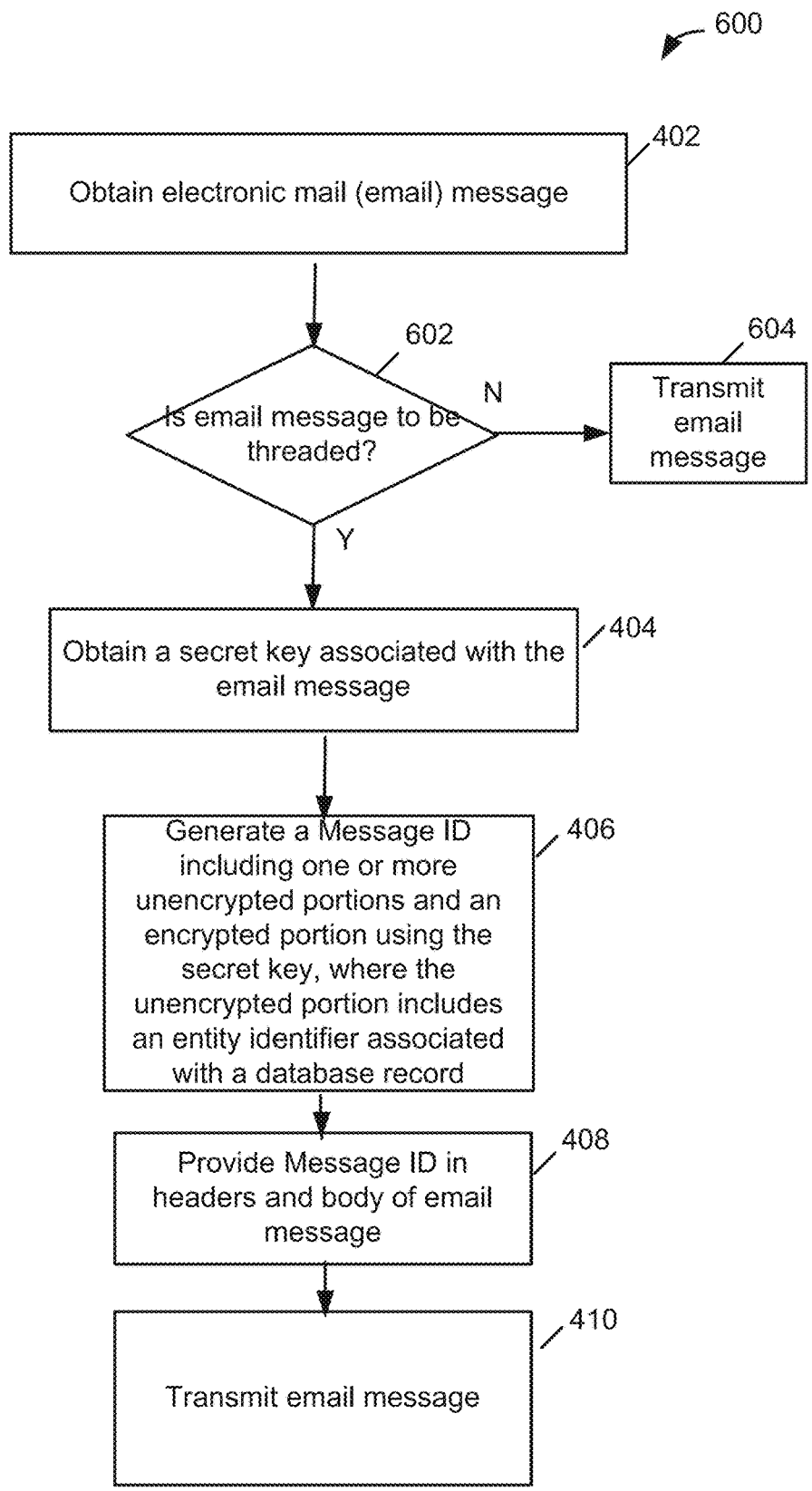
FIG. 6 shows a process flow diagram 600 illustrating an example of a method for selective processing of outbound email messages, in accordance with some implementations.

FIG. 6 shows a process flow diagram 600 illustrating an example of a method for selective processing of outbound email messages, in accordance with some implementations. As shown in this example, after an outbound email message is generated or otherwise obtained at 402, the system may determine whether the outbound email message is to be threaded at 602. In other words, the system may determine whether reply messages transmitted by a client device in response to the outbound email message are to be tracked or recorded in association with a database record corresponding to the outbound email message. More particularly, the system may be configured to thread a specific subset of outbound email messages. For example, the system may be configured to thread outbound email messages that have been automatically generated, manually generated, manually generated by a specific group or individual, or transmitted from a particular email address. As another example, the system may be configured to thread outbound email messages that are addressed to a particular individual, group, company (e.g. domain), or email address. As yet another example, the system may be configured to thread outbound email messages that pertain to a particular subset of database records, a particular type of database record, or a particular type of issue addressed by the outbound email message.

In some implementations, the subset of outbound email messages for which threading is to be performed can be configured via a graphical user interface (GUI). In other implementations, a user (e.g., agent) composing an outbound email message can indicate that threading is to be performed for the outbound email message by selecting a threading option via a GUI.

If the system determines that the outbound email message is not to be threaded, the system proceeds with transmitting the outbound email message at 604. Alternatively, if the system determines that the outbound email message is to be threaded, the system may proceed with processing the outbound email message at 404, as described above with reference to FIG. 4.

Figure 7:
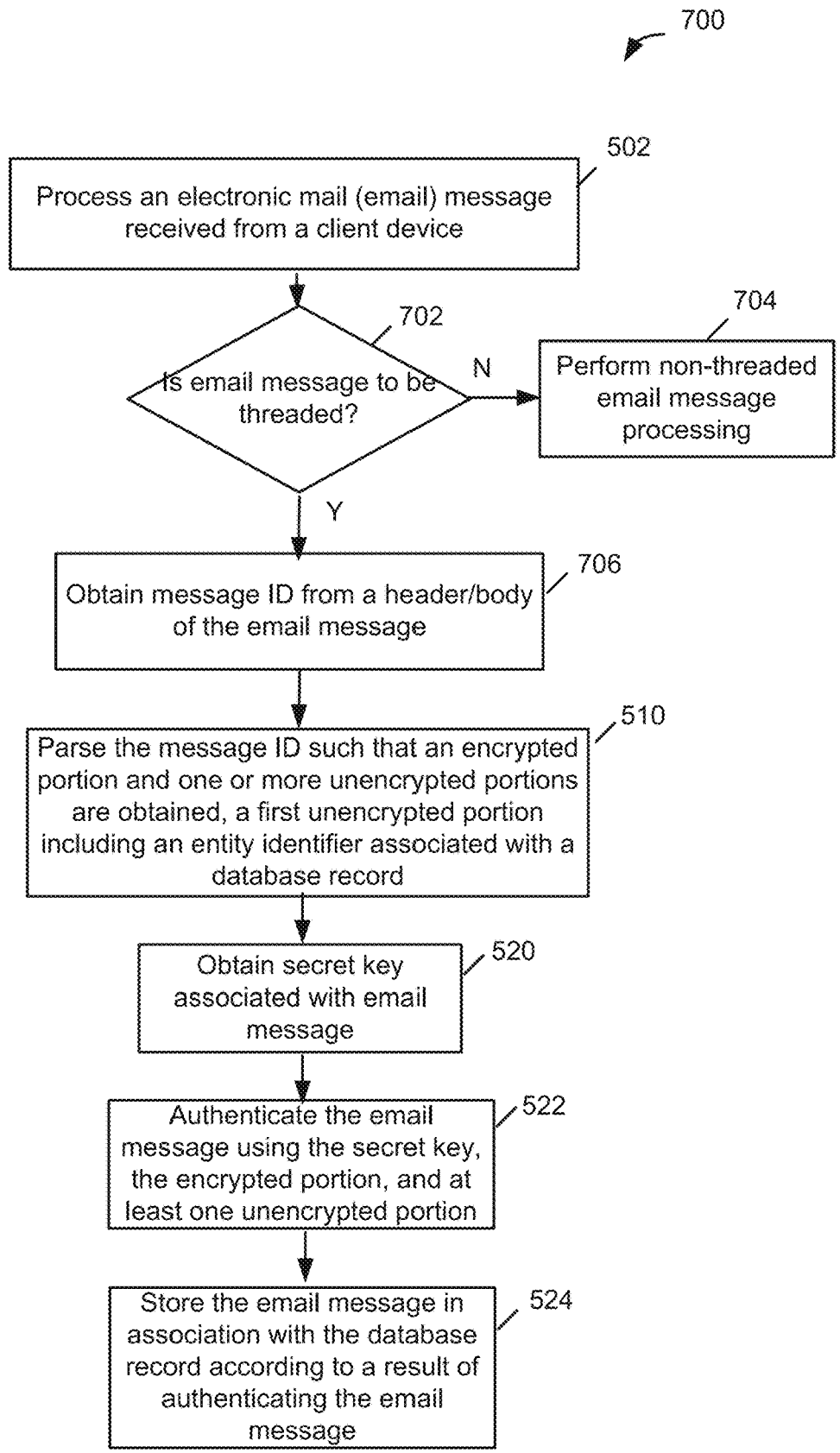
FIG. 7 shows a process flow diagram 700 illustrating an example of a method for selective processing of inbound email messages, in accordance with some implementations.

FIG. 7 shows a process flow diagram 700 illustrating an example of a method for selective processing of inbound email messages, in accordance with some implementations. As shown in this example, after an inbound email message is received or otherwise obtained at 502, the system may determine whether the inbound email message is to be threaded at 702. In other words, the system determines whether reply messages transmitted by a client device in response to a corresponding outbound email message are to be tracked or recorded in association with a database record associated with the corresponding outbound email message. Stated another way, the system determines whether to perform an authentication process such as that described herein on the inbound email message. For example, the system may be configured to thread inbound email messages that are addressed to a specific group, individual, or email address. As another example, the system may be configured to thread inbound email messages that are received from a particular domain, group, individual, or email address.

If the system determines that the inbound email message is not to be threaded, the system proceeds with performing non-threaded email message processing of the inbound email message at 704. For example, the system may route the inbound email message to the intended recipient without performing authentication of a message ID (if any), as described herein.

Alternatively, if the system determines that the inbound email message is to be threaded, the system proceeds with processing the inbound email message as described above with reference to FIGS. 5A-5B. More particularly, either a message ID obtained from a message header or a message ID string obtained from a message body is processed is obtained at 706. As described above, the message ID string may be obtained from the body after it is determined that the message IDS obtained from the headers cannot be used to successfully authenticate the inbound email message and obtain a valid record identifier.

In the above-described implementations, a message ID is encoded within the body of an outbound message, as well as within header(s) of the outbound message. As a result, a chain of emails associated with the outbound email can be automatically tracked regardless of whether email clients or its associated servers comply with the email protocol supported by system 102. The encoding of a message ID within the body of the outbound message may be performed using CSS, thereby preventing the display of the message ID string when the inbound email message is viewed by a user.

In the above description, examples are described with reference to identifiers such as an organization identifier. However, it is important to note that these examples are merely illustrative and other implementations are contemplated. For example, a message ID may be generated using a tenant identifier associated with a tenant of a multi-tenant database instead of an organization identifier.

As described herein, a message ID may be transmitted in the body of an outbound message, as well as any number of message headers of an outbound message. By transmitting the message ID in both header(s) and the body, this increases the likelihood that the message ID will be received in an inbound reply message transmitted in response to the outbound message. The message ID may be extracted from the header(s) and/or the body, thereby facilitating authentication of the inbound reply message and tracking in association with a pertinent record of a database system.

Some but not all of the techniques described or referenced herein are implemented using or in conjunction with a database system, which may be include a multi-tenant database system. The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. As mentioned below, the data can include social media messages created by other users. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

Some non-limiting examples of systems, apparatus, and methods are described below for implementing database systems in conjunction with the disclosed techniques. Such implementations can provide more efficient use of a database system.

Figure 8A:
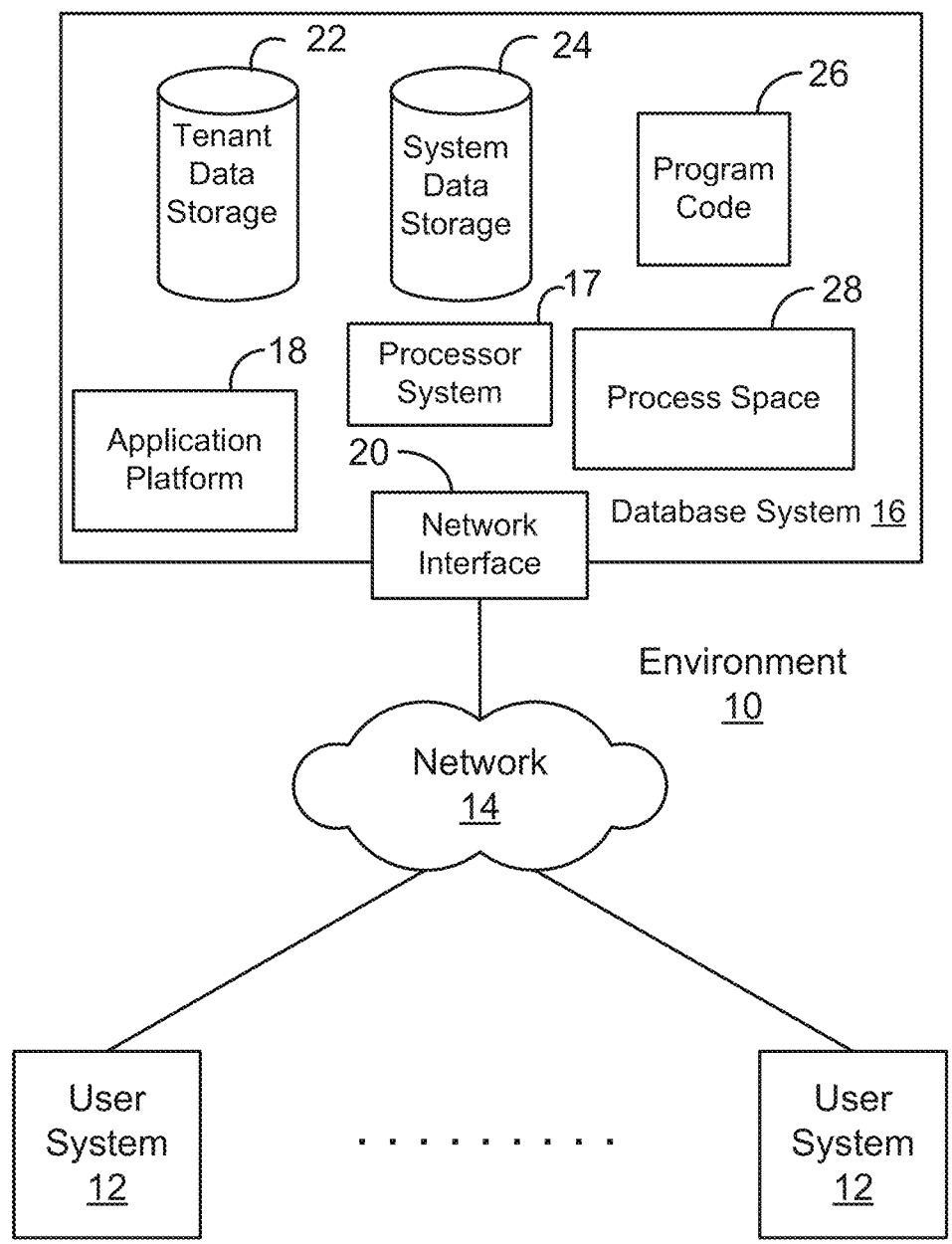
FIG. 8A shows a block diagram of an example of an environment 10 in which an on-demand database service can be used in accordance with some implementations.

FIG. 8A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above. A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 8A (and in more detail in FIG. 8B) user systems 12 might interact via a network 14 with an on-demand database service, which is implemented in the example of FIG. 8A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 8A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIGS. 7A and 7B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 8A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

Figure 8B:
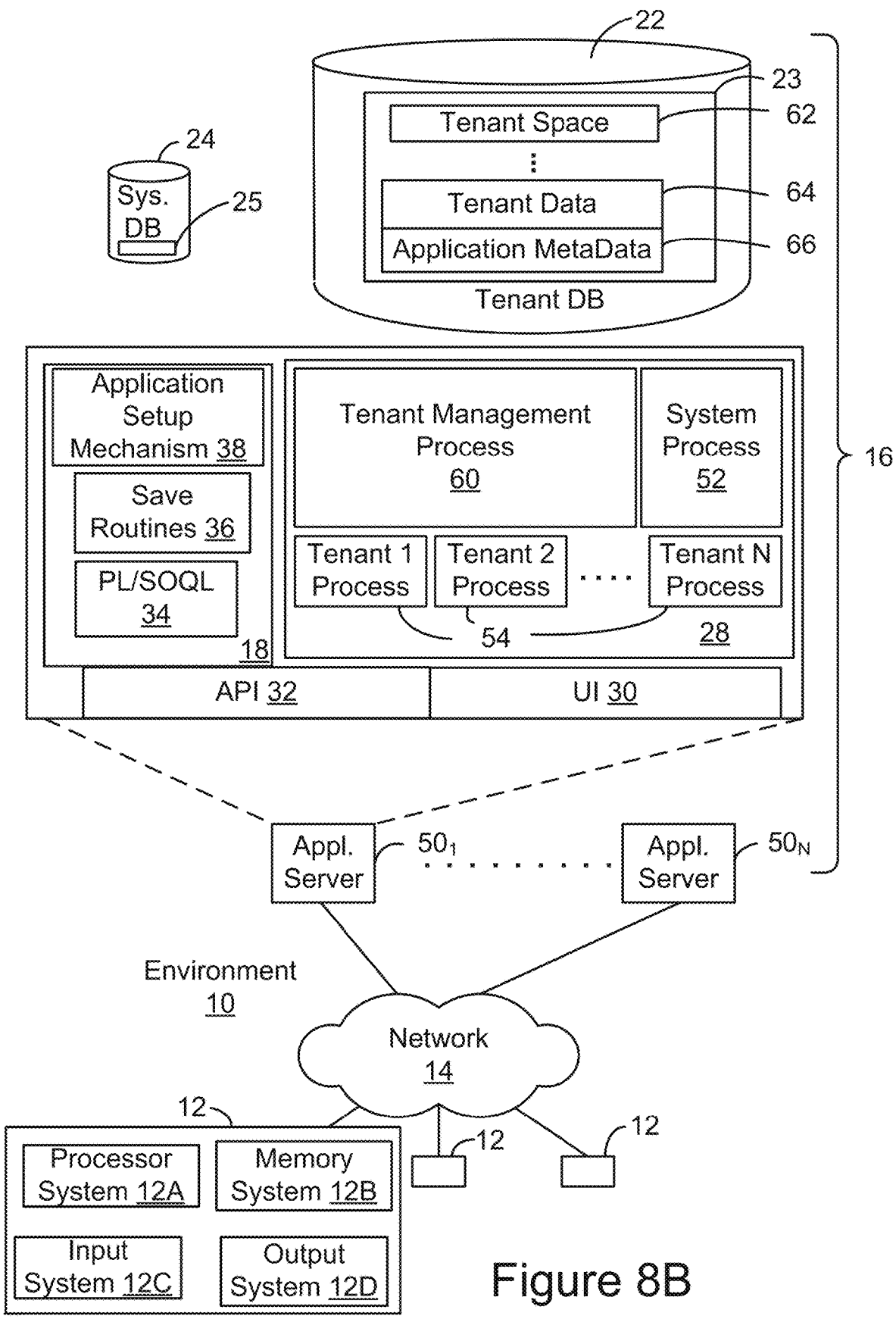
FIG. 8B shows a block diagram of an example of some implementations of elements of FIG. 8A and various possible interconnections between these elements.

FIG. 8B shows a block diagram of an example of some implementations of elements of FIG. 8A and various possible interconnections between these elements. That is, FIG. 8B also illustrates environment 10. However, in FIG. 8B elements of system 16 and various interconnections in some implementations are further illustrated. FIG. 8B shows that user system 12 may include processor system 12A, memory system 12B, input system 12C, and output system 12D. FIG. 8B shows network 14 and system 16. FIG. 8B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 8A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 8B, system 16 may include a network interface 20 (of FIG. 8A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases. Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 9A:
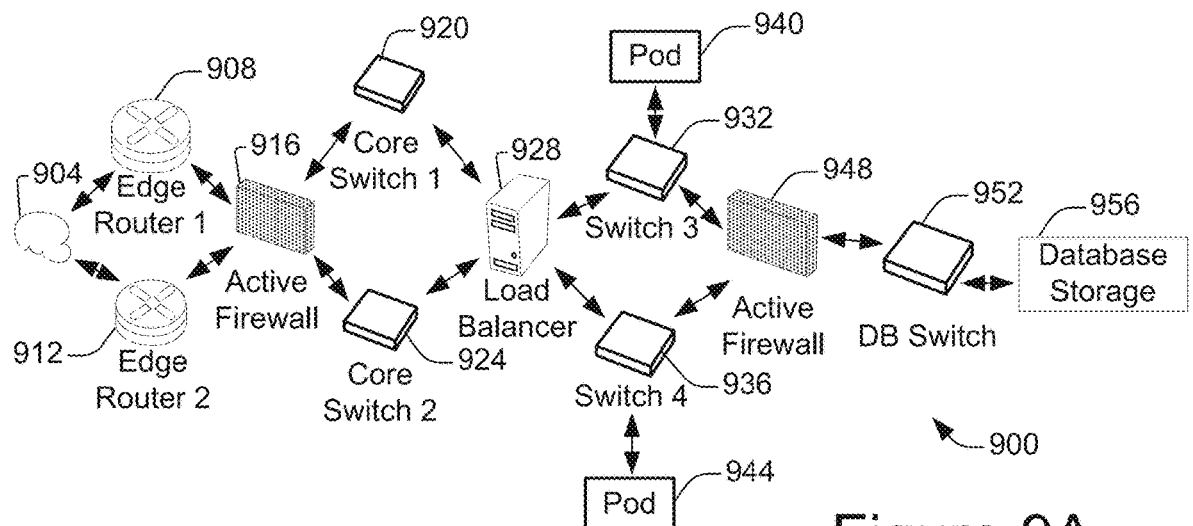
FIG. 9A shows a system diagram of an example of architectural components of an on-demand database service environment 900, in accordance with some implementations.

FIG. 9A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with database storage 956 via a database firewall 948 and a database switch 952.

As shown in FIGS. 8A and 8B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 8A and 8B, some implementations of an on-demand database service environment may include anywhere from one to many devices of each type. Also, the on-demand database service environment need not include each device shown in FIGS. 8A and 8B, or may include additional devices not shown in FIGS. 8A and 8B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 9B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 9A and 9B.

Figure 9B:
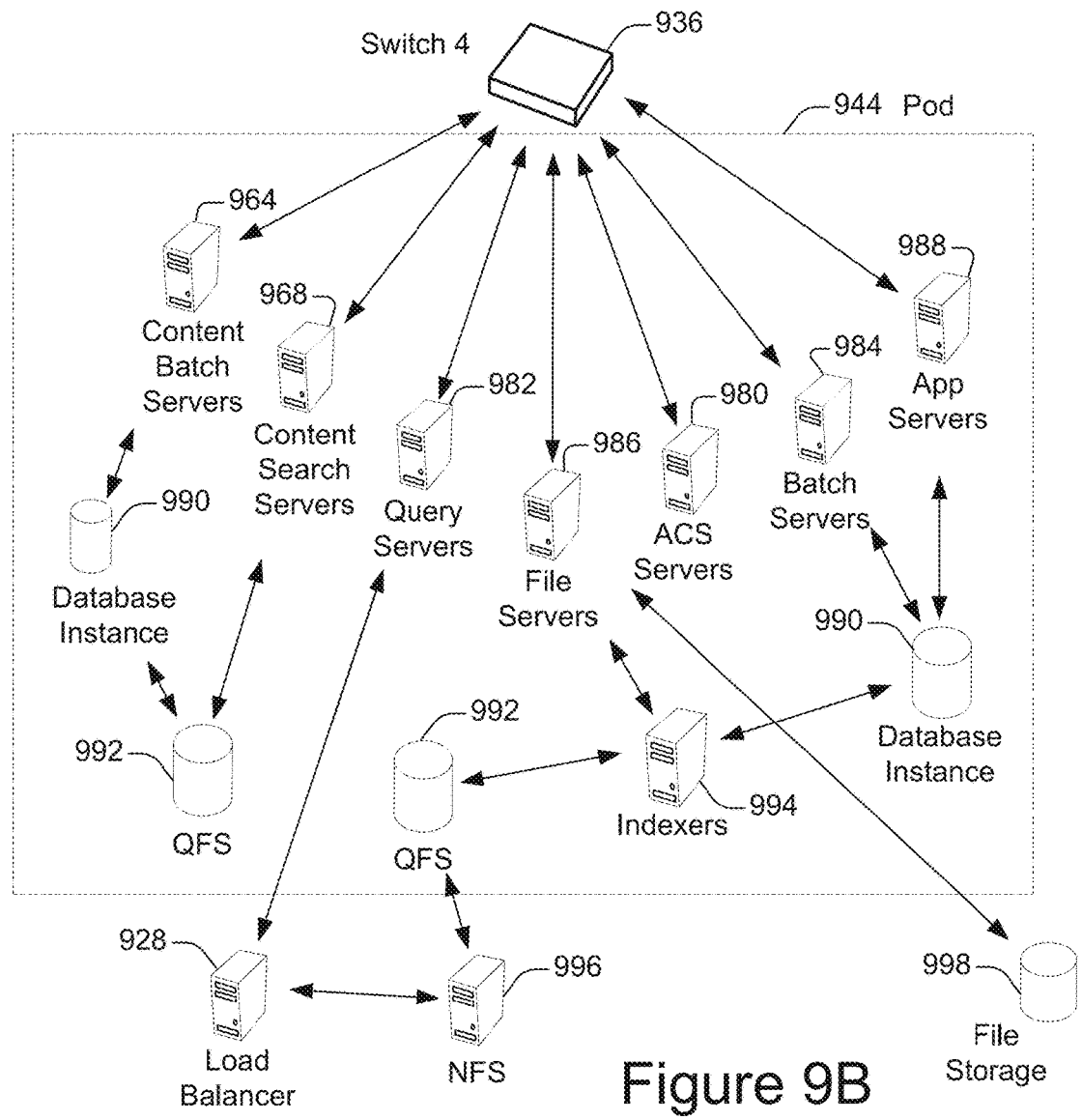
FIG. 9B shows a system diagram further illustrating an example of architectural components of an on-demand database service environment, in accordance with some implementations.

FIG. 9B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, California. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

In some implementations, one or more application servers or other servers described above with reference to FIGS. 7A and 7B include a hardware and/or software framework configurable to execute procedures using programs, routines, scripts, etc. Thus, in some implementations, one or more of application servers $50_1$-$50_N$ of FIG. 8B can be configured to initiate performance of one or more of the operations described above by instructing another computing device to perform an operation. In some implementations, one or more application servers $50_1$-$50_N$ carry out, either partially or entirely, one or more of the disclosed operations. In some implementations, app servers 988 of FIG. 9B support the construction of applications provided by the on-demand database service environment 900 via the pod 944. Thus, an app server 988 may include a hardware and/or software framework configurable to execute procedures to partially or entirely carry out or instruct another computing device to carry out one or more operations disclosed herein. In alternative implementations, two or more app servers 988 may cooperate to perform or cause performance of such operations. Any of the databases and other storage facilities described above with reference to FIGS. 7A, 7B, 8A and 8B can be configured to store lists, articles, documents, records, files, and other objects for implementing the operations described above. For instance, lists of available communication channels associated with share actions for sharing a type of data item can be maintained in tenant data storage 22 and/or system data storage 24 of FIGS. 7A and 7B. By the same token, lists of default or designated channels for particular share actions can be maintained in storage 22 and/or storage 24. In some other implementations, rather than storing one or more lists, articles, documents, records, and/or files, the databases and other storage facilities described above can store pointers to the lists, articles, documents, records, and/or files, which may instead be stored in other repositories external to the systems and environments described above with reference to FIGS. 7A, 7B, 8A and 8B.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory (ROM) devices and random access memory (RAM) devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:
1. A system comprising:
   a database system implemented using a server system, comprising:
   at least one hardware processor;
   when executed by the at least one hardware processor, the database system configurable to cause:

processing a first electronic mail message received via a network from a first client device, the first electronic message having a set of headers and a body;

obtaining a first message identifier (ID) from the body;

parsing the first message ID such that an encrypted portion and one or more unencrypted portions are obtained, a first unencrypted portion of the unencrypted portions including an entity identifier associated with a first database record of a database;

obtaining a secret key associated with the first electronic mail message;

authenticating the first electronic mail message using the secret key, the encrypted portion of the first message ID, and at least one unencrypted portion of the unencrypted portions of the first message ID; and processing the first electronic mail message according to a result of authenticating the first electronic mail message.

2. The system of claim 1, the database system further configurable to cause:

attempting to authenticate the first electronic mail message using at least one header of the set of headers prior to obtaining the first message ID from the body of the first electronic mail message.

3. The system of claim 1, the unencrypted portions including a key identifier, the database system further configurable to cause:

obtaining a secret key using the key identifier;

wherein authenticating is performed using the secret key.

4. The system of claim 1, the database system further configurable to cause:

processing the first electronic mail message by discarding the first electronic mail message responsive to determining that the first electronic mail message is not successfully authenticated.

5. The system of claim 1, the database system further configurable to cause:

creating a second database record associated with the entity identifier; and associating the first electronic mail message with the second database record.

6. The system of claim 1, the database system further configurable to cause:

identifying, within the body, a predefined set of characters, the predefined set of characters preceding the first message ID within the body.

7. The system of claim 6, the database system further configurable to cause:

providing the first message ID within a body of an outbound email message; and transmitting the outbound email message to the first client device.

8. A method, comprising:

processing a first electronic mail message received via a network from a first client device, the first electronic message having a set of headers and a body;

obtaining a first message identifier (ID) from the body;

parsing the first message ID such that an encrypted portion and one or more unencrypted portions are obtained, a first unencrypted portion of the unencrypted portions including an entity identifier associated with a first database record of a database;

obtaining a secret key associated with the first electronic mail message;

authenticating the first electronic mail message using the secret key, the encrypted portion of the first message ID, and at least one unencrypted portion of the unencrypted portions of the first message ID; and processing the first electronic mail message according to a result of authenticating the first electronic mail message.

9. The method of claim 8, further comprising:

attempting to authenticate the first electronic mail message using at least one header of the set of headers prior to obtaining the first message ID from the body of the first electronic mail message.

10. The method of claim 8, the unencrypted portions including a key identifier, the method further comprising:

obtaining a secret key using the key identifier;

wherein authenticating is performed by applying the secret key.

11. The method of claim 8, further comprising:

processing the first electronic mail message by discarding the first electronic mail message responsive to determining that the first electronic mail message is not successfully authenticated.

12. The method of claim 8, further comprising:

creating a second database record associated with the entity identifier; and associating the first electronic mail message with the second database record.

13. The method of claim 8, further comprising:

identifying, within the body, a predefined set of characters, the predefined set of characters preceding the message identifier string within the body.

14. The method of claim 13, further comprising:

providing the message identifier string within a body of an outbound email message; and transmitting the outbound email message to the first client device.

15. The method of claim 14, the message identifier string being provided via Cascading Style Sheets (CSS).

16. A non-transitory machine-readable storage medium having computer program instructions stored therein, the computer program instructions configured such that, when executed by one or more processors, the computer program instructions cause the one or more processors to:

process a first electronic mail message received via a network from a first client device, the first electronic message having a set of headers and a body;

obtain a first message identifier (ID) from the body;

parsing the first message ID such that an encrypted portion and one or more unencrypted portions are obtained, a first unencrypted portion of the unencrypted portions including an entity identifier associated with a first database record of a database;

obtain a secret key associated with the first electronic mail message;

authenticate the first electronic mail message using the secret key, the encrypted portion of the first message ID, and at least one unencrypted portion of the unencrypted portions of the first message ID; and process the first electronic mail message according to a result of authenticating the first electronic mail message.

17. The non-transitory machine-readable medium of claim 16, wherein the computer program instructions are further configured to cause the one or more processors to:

attempt to authenticate the first electronic mail message using at least one header of the set of headers prior to obtaining the first message ID from the body of the first electronic mail message.

18. The non-transitory machine-readable medium of claim 17, wherein the computer program instructions are further configured to cause the one or more processors to:
   obtain a secret key using the key identifier;
   wherein authenticating is performed using the secret key.

19. The non-transitory machine-readable medium of claim 16, wherein the computer program instructions are further configured to cause the one or more processors to:
   processing the first electronic mail message by discarding the first electronic mail message responsive to determining that the first electronic mail message is not successfully authenticated.

20. The non-transitory machine-readable medium of claim 16, wherein the computer program instructions are further configured to cause the one or more processors to:
   create a second database record associated with the entity identifier; and
   associate the first electronic mail message with the second database record.

* * * * *